(12) United States Patent
Radi et al.

(10) Patent No.: US 11,797,379 B2
(45) Date of Patent: Oct. 24, 2023

(54) ERROR DETECTION AND DATA RECOVERY FOR DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/665,330

(22) Filed: Feb. 4, 2022

(65) Prior Publication Data
US 2023/0251929 A1 Aug. 10, 2023

(51) Int. Cl.
*G06F 11/10* (2006.01)
*G06F 11/14* (2006.01)
*G06F 3/06* (2006.01)

(52) U.S. Cl.
CPC .......... *G06F 11/1048* (2013.01); *G06F 3/065* (2013.01); *G06F 3/0619* (2013.01); *G06F 3/0679* (2013.01); *G06F 11/1004* (2013.01); *G06F 11/1469* (2013.01)

(58) Field of Classification Search
None
See application file for complete search history.

(56) References Cited

U.S. PATENT DOCUMENTS 8,412,907 B1 4/2013 Dunshea et al.
8,700,727 B1 4/2014 Gole et al.
10,362,149 B2 7/2019 Biederman et al.
10,530,711 B2 1/2020 Yu et al.
(Continued)

FOREIGN PATENT DOCUMENTS

CN 106603409 A 4/2017
CN 112351250 A 2/2021
(Continued)

OTHER PUBLICATIONS

Y. Kang, Y. -s. Kee, E. L. Miller and C. Park, "Enabling cost-effective data processing with smart SSD," 2013 IEEE 29th Symposium on Mass Storage Systems and Technologies (MSST), Long Beach, CA, USA, 2013, pp. 1-12, doi: 10.1109/MSST.2013.6558444. (Year: 2013).*
(Continued)

*Primary Examiner* — Daniel F. McMahon
(74) *Attorney, Agent, or Firm* — Barry IP Law, P.C.

(57) ABSTRACT

A Non-Volatile Memory express (NVMe) node includes a memory used at least in part as a shared cache in a distributed cache. At least one processor of the NVMe node executes a kernel of an Operating System (OS). A request is received from another NVMe node to read data stored in the shared cache or to write data in the shared cache and an error detection operation is performed on the data for the request using the kernel. In another aspect, the kernel is used to perform Erasure Coding (EC) on data to be stored in the distributed cache. A network controller determines different EC ratios based at least in part on indications received from NVMe nodes of frequencies of access of different data and/or usage of the distributed cache by different applications. The network controller sends the determined EC ratios to the NVMe nodes.

20 Claims, 5 Drawing Sheets

(56) References Cited

U.S. PATENT DOCUMENTS

| | | | |
|---|---|---|---|
| 10,754,707 | B2 | 8/2020 | Tamir et al. |
| 10,757,021 | B2 | 8/2020 | Man et al. |
| 11,134,025 | B2 | 9/2021 | Billore et al. |
| 11,223,579 | B2 | 1/2022 | Lu |
| 2014/0143365 | A1 | 5/2014 | Guerin et al. |
| 2015/0006663 | A1* | 1/2015 | Huang ............... G06F 13/42 709/213 |
| 2015/0319237 | A1 | 11/2015 | Hussain et al. |
| 2017/0163479 | A1 | 6/2017 | Wang et al. |
| 2017/0269991 | A1* | 9/2017 | Bazarsky ............ G06F 3/064 |
| 2018/0191632 | A1 | 7/2018 | Biederman et al. |
| 2018/0341419 | A1* | 11/2018 | Wang ................. G06F 3/0644 |
| 2018/0357176 | A1 | 12/2018 | Wang |
| 2019/0227936 | A1 | 7/2019 | Jang |
| 2019/0280964 | A1 | 9/2019 | Michael et al. |
| 2020/0034538 | A1 | 1/2020 | Woodward et al. |
| 2020/0201775 | A1 | 6/2020 | Zhang et al. |
| 2020/0274952 | A1 | 8/2020 | Waskiewicz et al. |
| 2020/0285591 | A1* | 9/2020 | Luo .................. G06F 16/1827 |
| 2020/0322287 | A1 | 10/2020 | Connor et al. |
| 2020/0403905 | A1 | 12/2020 | Allen et al. |
| 2021/0019197 | A1 | 1/2021 | Tamir et al. |
| 2021/0058424 | A1 | 2/2021 | Chang et al. |
| 2021/0149763 | A1* | 5/2021 | Ranganathan ...... G06F 11/1064 |
| 2021/0157740 | A1 | 5/2021 | Benhanokh et al. |
| 2021/0240621 | A1* | 8/2021 | Fu ..................... G06F 12/084 |
| 2021/0266253 | A1 | 8/2021 | He et al. |
| 2021/0320881 | A1 | 10/2021 | Coyle et al. |
| 2021/0377150 | A1 | 12/2021 | Dugast et al. |
| 2022/0035698 | A1* | 2/2022 | Vankamamidi ...... G06F 3/0641 |
| 2022/0294883 | A1 | 9/2022 | Pope et al. |
| 2022/0350516 | A1* | 11/2022 | Bono .................. G06F 11/10 |
| 2022/0357886 | A1 | 11/2022 | Pitchumani et al. |
| 2022/0407625 | A1* | 12/2022 | Radi .................. H04L 41/147 |

FOREIGN PATENT DOCUMENTS

| | | |
|---|---|---|
| EP | 3358456 A1 | 8/2018 |
| EP | 3598309 B1 | 5/2022 |
| KR | 1020190090331 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

Pending U.S. Appl. No. 17/683,737, filed Mar. 1, 2022, entitled "Detection of Malicious Operations for Distributed Cache", Marjan Radi.

Tu et al.; "Bringing the Power of eBPF to Open vSwitch"; Linux Plumber 2018; available at: http://vger.kernel.org/ipc_net2018_talks/ovs-ebpf-afxdp.pdf.

Pending U.S. Appl. No. 17/741,244, filed May 10, 2022, entitled "In-Kernel Cache Request Queuing for Distributed Cache", Marjan Radi.

Pending U.S. Appl. No. 17/829,712, filed Jun. 1, 2022, entitled "Context-Aware NVMe Processing in Virtualized Environments", Marjan Radi.

Ghigoff et al., "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.

International Search Report and Written Opinion dated Sep. 30, 2022 from International Application No. PCT/US2022/029527, 9 pages.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al.; "Hoard: A Distributed Data Caching System to Accelerate Deep Learning Training on the Cloud"; arXiv Dec. 3, 2018; available at: https://arxiv.org/pdf/1812.00669.pdf.

International Search Report and Written Opinion dated Oct. 7, 2022 from International Application No. PCT/US2022/030044, 10 pages.

Maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

International Search Report and Written Opinion dated Oct. 25, 2022 from International Application No. PCT/JS2022/030414, 11 pages.

Sabella et al.; "Using eBPF for network traffic analysis"; available at: Year: 2018; https://www.ntop.org/wp-content/uploads/2018/10/Sabella.pdf.

Sao et al.; "OVS-CAB: Efficient rule-caching for Open vSwitch hardware offloading"; Computer Networks; Apr. 2021; available at:https://www.sciencedirect.com/science/article/abs/pii/S1389128621000244.

Pfaff et al.; "The Design and Implementation of Open vSwitch"; Usenix; May 4, 2015; available at: https://www.usenix.org/conference/nsdi15/technical-sessions/presentation/pfaff.

Pending U.S. Appl. No. 17/836,927, filed Jun. 9, 2022 entitled "Resource Allocation in Virtualized Environments", Marjan Radi.

Pending U.S. Appl. No. 17/850,767, filed Jun. 27, 2022 entitled "Memory Coherence in Virtualized Environments", Marjan Radi.

International Search Report and Written Opinion dated Nov. 18, 2022 from International Application No. PCT/US2022/030437, 10 pages.

Bachl et al.; "A flow-based IDS using Machine Learning in EBPF"; Cornell University;Feb. 19, 2021; available at https://arxiv.org/abs/2102.09980.

Caviglione et al.; "Kernel-level tracing for detecting stegomalware and covert channels in Linux environments" Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDoS Attacks Using Programmable Network Data Planes"; IEEE Access; Jul. 7, 2021; available at: https://ieeexplore.ieee.org/stamp/stamp.jsp?arnumber-9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21 Proceedings of the SIGCOMM'21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

(56) References Cited

OTHER PUBLICATIONS

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism" ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_.pdf.

Kourtis et al.; "Safe and Efficient Remote Application Code Execution on Disaggregated NVM Storage with eBPF" Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

Pending U.S. Appl. No. 17/561,898, filed Dec. 24, 2021, entitled "In-Kernel Caching for Distributed Cache", Marjan Radi.

Pending U.S. Appl. No. 17/571,922, filed Jan. 10, 2022, entitled "Computational Acceleration for Distributed Cache", Marjan Radi.

Bijlani et al.; "Extension Framework for File Systems in User space"; Jul. 2019; Usenix; available at: https://www.usenix.org/conference/atc19/presentation/bijlani.

Brad Fitzpatrick; "Distributed Caching with Memcached"; Aug. 1, 2004; Linux Journal; available at: https://www.linuxjournal.com/article/7451.

Roderick W. Smith; "The Definitive Guide to Samba 3"; 2004; APress Media; pp. 332-336; available at: https://link.springer.com/book/10.1007/978-1-4302-0683-5.

Wu et al.; "NCA: Accelerating Network Caching with eXpress Data Path"; Nov. 2021; IEEE; available at https://ieeexplore.ieee.org/abstract/document/9680837.

* cited by examiner

ERROR DETECTION AND DATA RECOVERY FOR DISTRIBUTED CACHE

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/683,737 [[17/###, ###]] titled "DETECTION OF MALICIOUS OPERATIONS FOR DISTRIBUTED CACHE", filed on Mar. 1, 2022, which is hereby incorporated by reference in its entirety.

BACKGROUND

Current trends in cloud computing, big data, and Input/Output (I/O) intensive applications have led to greater needs for high performance distributed systems in data centers in terms of low latency, high throughput, and bandwidth. Although protocols such as Non-Volatile Memory express (NVMe) have been extended over networks, such as with NVMe over Fabrics (NVMeOF), to support access to high performance NVMe devices, such as NVMe Solid-State Drives (SSDs), distributed systems are susceptible to network errors due to unreliable networks, such as with an Ethernet network, and errors at various devices in the network. Such errors can cause significant data loss and service down time that can greatly affect system performance.

Traditionally, distributed storage systems rely on data replication for fault-tolerance. To reduce the storage overhead of replication, some distributed storage systems may use Erasure Coding (EC) to split the data into data blocks and generate parity blocks to form a larger set of blocks including the data blocks and the parity blocks. The data blocks and parity blocks can each be stored at different devices in the system for fault tolerance. Depending on the number of parity blocks, a certain number of lost or corrupted data blocks can be recovered from a subset of the remaining data blocks. Although EC can decrease the amount of storage overhead as compared to storing redundant copies, EC increases the processing overhead of the devices that must generate the blocks and reconstruct missing or corrupted blocks.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
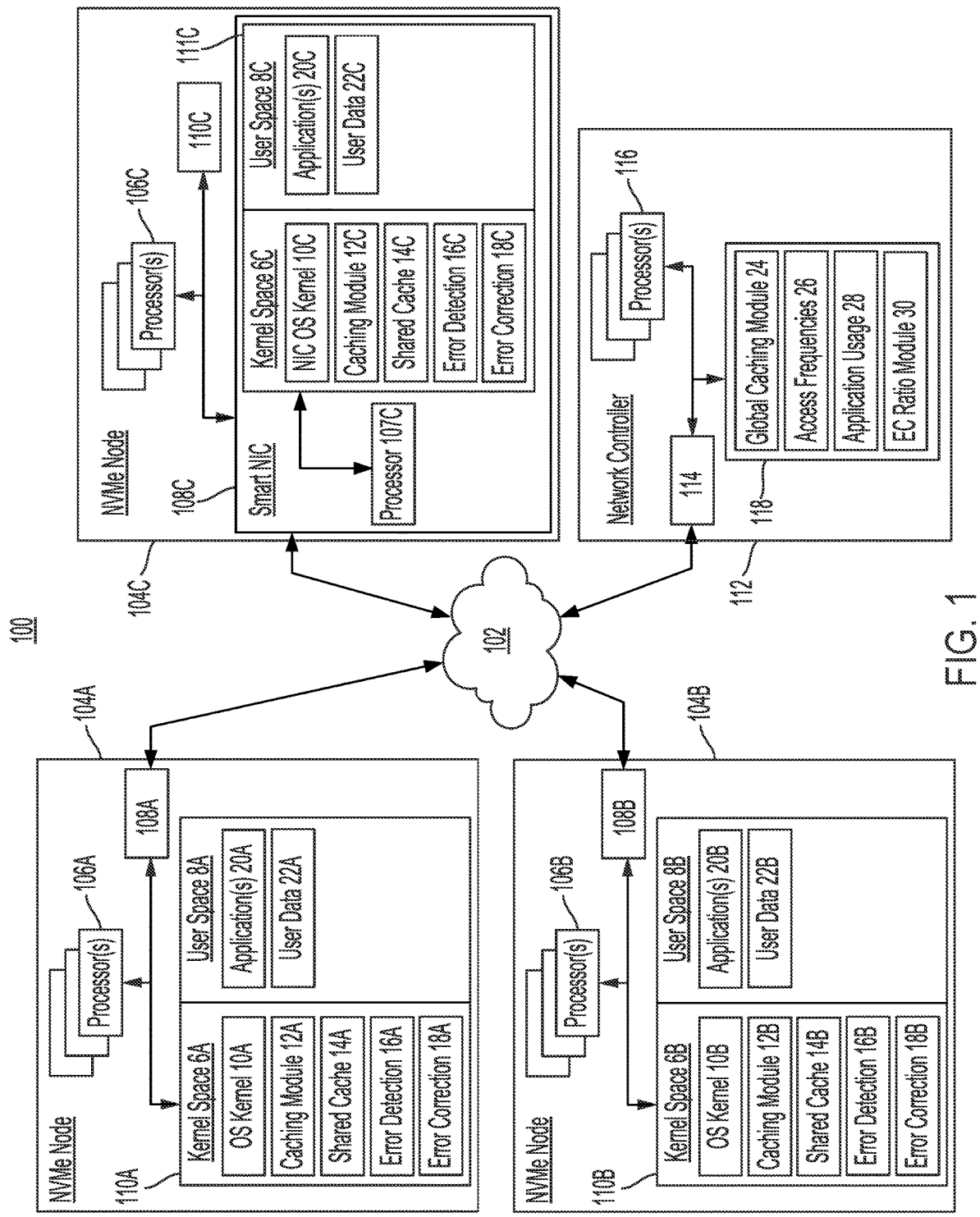
FIG. 1 illustrates an example network environment for implementing error detection and data recovery for a distributed cache according to one or more embodiments.

FIG. 1 illustrates an example network environment 100 for implementing error detection, error correction, and Erasure Coding (EC) for a distributed cache according to one or more embodiments. As shown in FIG. 1, Non-Volatile Memory express (NVMe) nodes 104A, 104B, and 104C communicate with each other via network 102. In addition, network controller 112 communicates with NVMe nodes 104 via network 102. NVMe nodes 104 may function as, for example, servers or processing nodes and/or memory nodes. As a processing node or compute node, a NVMe node 104 can include one or more processors 106, such as Reduced Instruction Set Computer (RISC)-V cores or other type of Central Processing Unit (CPU) to process data, such as for a distributed application. As a memory node, a NVMe node 104 provides a shared cache that may be accessed by other NVMe nodes on network 102 and form part of a distributed cache shared among NVMe nodes on network 102.

In some implementations, network environment 100 in FIG. 1 may be used as at least part of a data center and/or for distributed processing, such as for distributed machine learning or big data analysis. As will be appreciated by those of ordinary skill in the art, NVMe nodes 104 and network controller 112 are shown for the purposes of illustration, and network environment 100 can include many more NVMe nodes 104 than those shown in FIG. 1. In addition, those of ordinary skill the art will appreciate that network environment 100 can include more components than shown in FIG. 1, such as aggregated switches or Top of Rack (ToR) switches, for example.

Network 102 can include, for example, a Storage Area Network (SAN), a Local Area Network (LAN), and/or a Wide Area Network (WAN), such as the Internet. In this regard, NVMe nodes 104A, 104B, and 104C, and/or network controller 112 may not be in the same geographic location. NVMe nodes 104 and network controller 112 may communicate using one or more standards such as, for example, Ethernet.

Each NVM node 104 includes one or more processors 106, a network interface 108, and a memory 110. These components of NVMe nodes 104 may communicate with each other via a bus, which can include, for example, a Peripheral Component Interconnect express (PCIe) bus. In some implementations, NVMe nodes 104 may include NVMe over Fabric (NVMeoF) nodes that are configured to communicate with other network devices, such as NVMe nodes 104 and network controller 112, using NVMe messages (e.g., NVMe commands and responses) that may be, for example, encapsulated in Ethernet packets using Transmission Control Protocol (TCP). In this regard, network interfaces 108A and 108B of NVMe nodes 104A and 104B, respectively, may include Network Interface Cards (NICs) or can include other network interface devices, such as smart NICs, network interface controllers, or network adapters.

In this regard, NVMe node 104C includes a smart NIC 108C as its network interface. As discussed in more detail below, smart NIC 108C includes its own processor 107C and memory 111C that can be used for performing the error detection, error correction, EC, and data recovery operations disclosed herein, such as reconstructing a lost or corrupted data block using parity blocks. This arrangement can ordinarily improve the performance of NVMe node 104C in offloading error detection, error correction, EC, and/or data recovery operations from from a processor 106C of NVMe node 104C to Smart NIC 108C of NVMe 104B.

Processors 106 and 107C in FIG. 1 can execute instructions, such as instructions from one or more applications (e.g., applications 20) or modules (e.g., caching module 12, error detection module 16, or EC module 18) loaded from a memory 110 or 111C, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111C can include, for example, a volatile Random Access Memory (RAM) such as Static RAM (SRAM), Dynamic RAM (DRAM), or a non-volatile RAM, or other solid-state memory that is used by processors 106 or 107C. Data stored in memory 110 or memory 111C can include data read from another NVMe node 104, data to be stored in another NVMe node 104, instructions loaded from an application or from an OS for execution by the processor, and/or data used in executing such applications, such as user data 22.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111C may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memories 110A and 110B of NVMe nodes 104A and 104B, respectively, include a kernel space 6A or 6B that is used by OS kernel 10A or 10B and a user space 8A or 8B that is used by one or more applications 20, such as for accessing user data 22. Kernel space 6A or 6B and user space 8A or 8B, respectively, can include separate portions of virtual memory mapped to physical addresses in memory 110A or 110B, respectively. As will be understood by those of ordinary skill in the art, access to kernel space 6A or 6B is generally restricted to OS kernel 10A or 10B, respectively, its kernel extensions, and other portions of an OS, such as device drivers, while access to user space 8A or 8B is available to both applications 20 and the OS. In this regard, the OS of NVMe node 104A or 104B, or the OS of smart NIC 108C allocates hardware and software resources, such as memory, network, and processing resources of the device.

As shown in FIG. 1, kernel space 6A or 6B includes caching module 12A or 12B, shared cache 14A or 14B, error detection module 16A or 16B, and EC module 18A or 18B. In implementations where the OS of NVMe node 104A or 104B is Linux, caching module 12A or 12B, error detection module 16A or 16B, and EC module 18A or 18B can include extended Berkeley Berkely Packet Filter (eBPF) programs that are executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs.

In the example of FIG. 1, caching module 12A or 12B can enable OS kernel 10A or 10B, respectively, to access data for the distributed cache in shared cache 14A or 14B that is stored in kernel space 6A or 6B, respectively, as opposed to user space 8A or 8B. As discussed in related co-pending application Ser. No. 17/561,898, which is incorporated by reference above, frequently accessed data can be stored in shared cache 14A or 14B using caching module 12A or 12B to accelerate remote memory operations at a nearly line rate without requiring special hardware or changes to the kernel in the case where caching module 12A or 12B is an eBPF program. The remote memory operations, such as read requests and write requests, can be processed at an earlier point in the kernel, as opposed to having to traverse a full network stack and full I/O stack of the kernel to finally be handled by an application in user space 8A or 8B. For example, caching module 12A or 12B, error detection module 16A or 16B, and EC module 18A or 18B may operate at a lower block device driver layer in the I/O stack, without having to pass memory requests through higher layers in the I/O stack, such as a generic block layer and file system layer of the kernel. Similarly, caching module 12A or 12B, error detection module 16A or 16B, and EC module 18A or 18B may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed caches due to faster interface standards, such as NVMeOF, and the increasing bandwidths of network hardware. Caching data for the distributed cache in kernel space 6A or 6B and performing error detection, error correction, EC, and/or data recovery in kernel space 6A or 6B can enable OS kernel 10A or 10B to perform such operations quicker on behalf of user space applications 20A or 20B. Although there is some development in allowing user space applications to bypass the kernel and have direct access to storage or memory devices, such as NVMe devices, such performance improvements will come at the cost of reimplementing complicated default kernel functions in user space. In contrast, the in-kernel error detection, error correction, EC, and data recovery of the present disclosure can use a kernel extension, such as an eBPF program, that is added to or injected into the kernel without requiring changes to the kernel source code or reloading a kernel module.

Each of error detection module 16A or 16B and EC module 18A or 18B can be executed by OS kernel 10A or 10B, respectively, to perform different error detection, error correction, EC, and/or data recovery operations on data for requests received from applications executing on the NVMe node or on data for external requests received from other NVMe nodes, thereby accelerating the performance of such operations that would otherwise involve transferring data through the full I/O stack and full network stack of the kernel. In some cases, caching module 12A or 12B in kernel space 6A or 6B can call or initiate error detection module 16A or 16B and/or EC module 18A or 18B to perform operations that would otherwise be performed by one or more applications 20A or 20B in user space 8A or 8B. In other cases, error detection module 16A or 16B and/or EC module 18A or 18B can be called or initiated by an application 20 in user space 8A or 8B to offload error detection, error correction, EC, and/or data recovery operations from the application 20 to the OS kernel 10A or 10B operating in kernel space 6A or 6B, which can reduce the amount of data that would otherwise need to traverse the full I/O stack and full network stack of the kernel.

Error detection modules 16A or 16B can detect errors in data read from shared cache 14A or 14B or in data to be written to shared cache 14A or 14B by performing at least one error detection operation. In the case of data read from shared cache 14A or 14B, the error may result from corruption of the stored data. In the case of data to be written to shared cache 14A or 14B, the error may result from network errors, such as dropped packets or noise in the network. The error detection operation or operations performed by error detection module 16A or 16B can include, for example, performing a Cyclic Redundancy Check (CRC) on the data, performing a checksum on the data, performing a parity check on the data, or performing an Error Correcting Code (ECC) on the data. The error detection operation is performed in kernel space 6A or 6B, which can reduce the latency in performing the operation and can reduce the processing and memory resources required for the operation, as compared to performing the error detection operation in user space 8A or 8B. In cases where one or more errors are detected in the data, error detection modules 16A and 16B can be used to correct or recover data, such as by performing the CRC, checksum, or ECC operations noted above.

EC module 18A or 18B can perform operations to create erasure encoded data to be stored in the distributed cache at the NVMe node and/or at other NVMe nodes, such as by fragmenting data into data blocks and calculating parity blocks from the data blocks, such as by performing XOR operations. In addition, EC module 18A or 18B can perform data recovery operations to reconstruct one or more missing or corrupted data blocks by obtaining one or more parity blocks from the NVMe node and/or other NVMe nodes and generating the missing data block or blocks using the parity block or blocks, such as by performing XOR operations.

In other cases, EC module 18A or 18B may receive data to be stored in the distributed cache from an application 20 executed by the NVMe node. In such cases, EC module 18A or 18B may fragment the data into equally sized data blocks and calculate a particular number of parity blocks from the data blocks. As discussed in more detail below, an EC ratio of the number of data blocks and the number of parity blocks can be selected by EC module 18A or 18B based on at least one of the application 20 originating the storage request and a frequency of access of the data for the request (e.g., a number of writes and/or reads to the logical address or addresses associated with the data during a predetermined period of time). According to one aspect of the present disclosure, the NVMe node may receive different EC ratios from network controller 112 that are based on at least one of a frequency of access of different data in the distributed cache and a usage of the distributed cache by different applications. In some implementations, the network controller can adjust the EC ratios based on different workloads or data traffic on the network and a Quality of Service (QoS) indicated for an application.

In some cases, EC module 18A or 18B may determine that a data block for data requested by an application 20 executed by the NVMe node was not received from another NVMe node or error detection module 16A or 16B may determine that a received data block is too corrupted to be corrected by error detection module 16A or 16B. In such cases, EC module 18A or 18B may request a parity block from another NVMe node and use the requested parity block to reconstruct the missing or corrupted data block using the remaining data blocks.

As with error detection modules 16A and 16B discussed above, EC modules 18A and 18B perform operations in kernel spaces 6A and 6B, respectively, as opposed to performing operations in a user space. This ordinarily enables faster data recovery and EC since data does not need to traverse the full I/O stack and network stack of the kernel and can also conserve the processing and memory resources allocated to applications 20 in the user space.

In the example of FIG. 1, shared caches 14A and 14B can be used by caching modules 12A and 12B, respectively, to share data between the kernel space and the user space. In some implementations, shared caches 14 can include one or more eBPF maps that enable copies of data to be provided to applications 20 in user space 8 and to store data from applications 20. Shared caches 14 can include a data structure, such as a Key Value Store (KVS) or a table, for example. The use of an eBPF map as a shared cache can enable different applications 20 in a user space to concurrently access the data stored in the shared cache.

NVMe node 104C differs from NVMe nodes 104A and 104B in the example of FIG. 1 in that NVMe node 104C includes smart NIC 108C with its own processor 107C and memory 111C that are used as a hardware offload from processors 106C for error detection, error correction, and EC operations related to the distributed cache and the data accessed in shared cache 14C of memory 111C. This arrangement can further improve the performance of the error detection, error correction, EC, and data recovery of NVMe node 104C by performing these operations at an earlier point closer to the network and can also further free up processing resources and memory for processors 106C of NVMe node 104C.

As shown in FIG. 1, memory 111C of smart NIC 108C includes kernel space 6C and user space 8C. Kernel space 6C stores NIC OS kernel 100, caching module 12C, shared cache 14C, error detection module 16C, and EC module 18C. User space 8C, on the other hand, stores applications 20C and user data 22C. In implementations where the NIC OS kernel 100 is Linux, caching module 12C, error detection module 16C, and EC module 18C can include eBPF programs that are executed as an extension of the Linux kernel.

Each of caching module 12C, error detection module 16C, and EC module 18C can be executed by NIC OS kernel 100 to perform different operations on data read from the distributed cache (i.e., from one or more shared caches 14) or data written to the distributed cache (i.e., to one or more shared caches 14) with little to no involvement of applications 20C in user space, thereby accelerating the performance of such operations that would otherwise involve transferring data through the full I/O stack and full network stack of the kernel. In some cases, caching module 12C executed in kernel space by processor 107C can call or initiate caching error detection module 16C and/or EC module 18C to perform operations that would otherwise be performed by one or more applications 20C executed in user space by one or more processors 106C. In other cases, error detection module 16C or EC module 18C can be called or initiated by an application 20C in user space to offload error detection, error correction, and/or EC operations from the application 20C to the NIC OS kernel 100 operating in kernel space, which offloads the processing from one or more processors 106C to processor 107C of smart NIC 108C and also reduces the amount of data that would otherwise need to traverse the full I/O stack and full network stack of an OS kernel of NVMe node 104C.

Shared cache 14C can be used by caching module 12C to share data between a kernel space and a user space and provide part of the distributed cache. In some implementations, shared cache 14C can include one or more eBPF maps that enable copies of data to be provided to applications 20C in user space and to store data from applications 20C. Shared cache 14C can include a data structure, such as a KVS or a table, for example. The use of an eBPF map as shared cache 14C can enable different applications 20C in a user space to concurrently access the data stored in the shared cache.

In the example of FIG. 1, network controller 112 can receive indications from the NVMe nodes 104 of at least one of respective frequencies of access of different data stored in the shared caches 14 and usage of the shared caches by different applications. This information can be stored in memory 118 of network controller 112 as access frequencies 26 and application usage 28, respectively. Global caching module 24 can provide global cache coherency in managing the distributed cache, such as by providing a centralized directory for the data stored in the respective shared caches 14 forming the distributed cache. In some cases, global caching module 24 may also manage where different blocks are stored for fault tolerant storage techniques, such as for EC or other data replication techniques. In some implementations, network controller 112 is a Software Defined Networking (SDN) controller.

Processor or processors 116 of network controller 112 can include circuitry such as a CPU, GPU, microcontroller, a DSP, an ASIC, an FPGA, hard-wired logic, analog circuitry and/or a combination thereof. In some implementations, processor or processors 116 can include an SoC, which may be combined with one or both of memory 118 and interface 114. Memory 118 can include, for example, a volatile RAM such as DRAM, a non-volatile RAM, or other solid-state memory that is used by processor 116 to store data. Network controller 112 communicates with NVMe nodes 104 via interface 114, which may interface according to a standard, such as Ethernet.

As discussed in more detail below with reference to the EC ratio determination process of FIG. 5, one or more processors 116 of network controller 112 can use EC ratio module 30 stored in memory 118 to determine different EC ratios based at least in part on the received indications of the frequencies of access of different data in the distributed cache and/or the usage of the distributed cache by different applications. The use of different EC ratios based on frequency of access and/or application usage can better balance the use of processing and memory resources at the NVMe nodes 104 depending on the workload of the NVMe node, which may change over time.

In addition, EC ratio module 30 may be used to adjust the EC ratios based on an amount of data traffic on network 102 and indications of different QoS or priorities for respective applications. For example, EC ratio module 30 may decrease the number of data blocks for data that is more frequently accessed and/or for applications with a higher usage of the distributed cache in response to an increase in the amount of data traffic in network 102 so that the amount of network traffic is decreased. As another example, EC ratio module 30 may decrease the number of data blocks for an application with a high priority or QoS, such as for a video streaming application, so that the overhead and latency in performing EC for the application is decreased.

As will be appreciated by those of ordinary skill in the art, lost or corrupted data blocks can be recovered for up to N lost or corrupted data blocks out of a total of M data blocks when using an EC algorithm, where N blocks represent the number of parity blocks. In other words, the number of N parity blocks in the EC ratio determines the number of missing or corrupted blocks that can be tolerated, but represents an additional storage overhead needed to store the N additional parity blocks as compared to the original size of the M data blocks. The number of M data blocks corresponds to the overhead in terms of processing and memory resources in calculating the parity blocks and recovering missing or corrupted data blocks.

To reduce the processing overhead and the network traffic for frequently accessed data (i.e., "hot" data) stored in the distributed cache, EC ratio module 30 can reduce the number of M data blocks for EC of such frequently accessed data as compared to less frequently accessed data (i.e., "cold" data) of the same size. For example, frequently accessed data may only use a total of six blocks corresponding to four data blocks and two parity blocks and use a total of ten blocks corresponding to eight data blocks and two parity blocks for less frequently accessed data. Calculating the parity blocks and recovering missing data blocks for frequently accessed data would then require only four blocks, while calculating the parity blocks and recovering the missing data blocks of less frequently accessed data would require eight blocks. Using less M data blocks for frequently accessed data reduces the processing overhead needed for the encoding and recovery of such data, and reduces the network traffic when storing and reconstructing such data since there are less blocks stored at and retrieved from the different NVMe nodes 104.

To reduce the processing overhead for applications that frequently access the distributed cache, EC ratio module 30 can reduce the number of data blocks in the EC ratio for data that is written by or accessed by applications that use the distributed cache more often than other applications. Network controller 112 can then adjust EC ratios based on an overall data traffic load and/or the performance requirements for different applications, such as for applications that may require a lower latency. For example, EC ratio module 30 may set a lower number of M data blocks for data flows or data accessed by applications that require a lower latency and/or that comprise a larger portion of the overall network traffic.

Those of ordinary skill in the art will appreciate with reference to the present disclosure that other implementations may include a different number or arrangement of NVMe nodes 104 than shown in the example of FIG. 1. In this regard, network environment 100 shown in FIG. 1 is for the purposes of illustration, and those of ordinary skill in the art will appreciate that network environment 100 may include many more NVMe nodes 104 and additional components, such as routers and switches, than shown in the example of FIG. 1. In addition, those of ordinary skill in the art will appreciate with reference to the present disclosure that the modules, programs, and data structures shown in FIG. 1 may differ in other implementations. For example, in some implementations, error detection module 16 may be combined with EC module 18. As another example variation, a caching module 12 may be combined in some implementations with an error detection module 16 and/or EC module 18.

Example Processes

Figure 2:
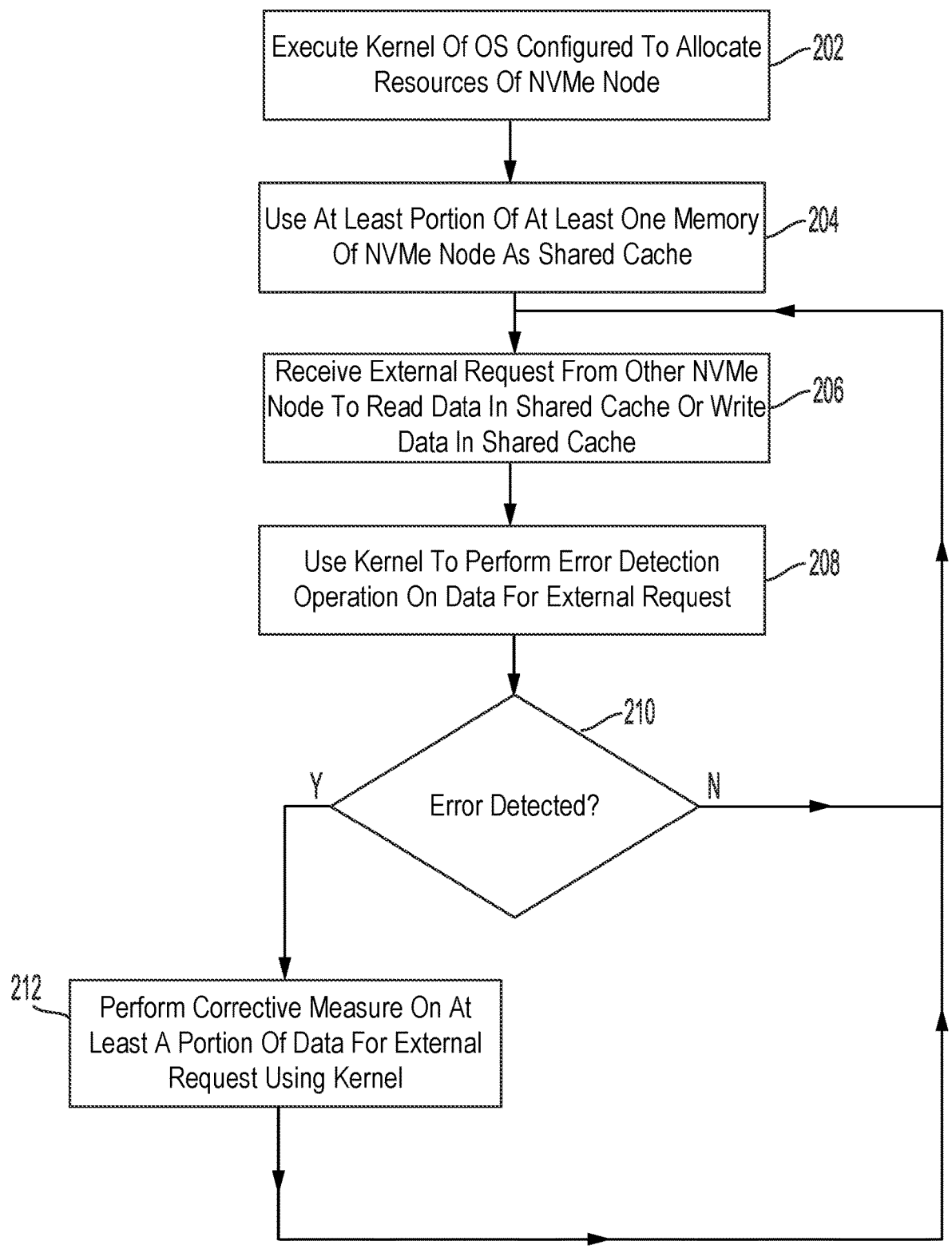
FIG. 2 is a flowchart for an error detection and data correction process according to one or more embodiments.

FIG. 2 is a flowchart for an error detection and data recovery process according to one or more embodiments. The process of FIG. 2 may be performed by, for example, a processor 106 of an NVMe node 104 or processor 107C of smart NIC 108C in FIG. 1 executing an error detection module 16B.

In block 202, a kernel of an OS is executed by a processor to allocate resources of an NVMe node. In implementations where the processor executes an OS for a smart NIC (e.g., smart NIC 108C in FIG. 1), the processor may use the OS to allocate resources of the smart NIC and the memory or storage that it controls.

In block 204, at least a portion of at least one memory of the NVMe node is used as a shared cache in a distributed cache (e.g., shared cache 14A, 14B, or 14C in FIG. 1). The distributed cache can include respective shared caches of other devices on a network.

In block 206, the NVMe node receives an external request from another NVMe node to read data in the shared cache or to write data in the shared cache. In some implementations, the processor uses the kernel to access or cache data for a distributed cache in a kernel space of at least one memory of the NVMe node. As used herein, accessing data can include reading, modifying, and writing data. A kernel extension (e.g., an eBPF program) may use one or more data structures (e.g., one or more eBPF maps) in a kernel space of a memory that is reserved for the OS. The kernel or kernel extension can then share the data cached in the data structure with user applications that operate in a user space of the NVMe node. Those of ordinary skill in the art will appreciate with reference to the present disclosure that the execution of the OS kernel in block 202 and use of at least a portion of at least one memory of the NVMe node in block 204 can overlap with the accessing of data in block 206.

In this regard, using the kernel for caching data in a distributed cache reduces the overhead on the processor by not having to pass all remote memory messages from other network devices (e.g., read requests, write requests, permission requests, cache directory updates, acknowledgments, discovery requests) through the full network stack and full I/O stack of the kernel and to applications in the user space. The response time to remote memory requests or processing time for remote memory messages is significantly improved since the memory requests and messages can be processed at a much earlier point in the kernel.

In block 208, the processor uses the kernel to perform an error detection operation on the data for the external request. As noted above, the error detection operation can include, for example, performing a CRC on the data, performing a parity check on the data, performing a checksum on the data, or performing ECC on the data. In the case where the external request is a read request, the processor can perform the error detection operation on the data read from the shared cache for the external request, which may have been corrupted during its storage in or retrieval from the shared cache. In the case where the external request is a write request, the processor can perform the error detection operation on the data to be written in the shared cache, which may have been corrupted in transit to the NVMe node through the network.

In block 210, the processor determines whether an error was detected by the error detection operation. If no errors are detected in block 210, the process returns to block 206 to receive other external requests from other NVMe nodes to access the shared cache.

On the other hand, if one or more errors are detected in block 210, the processor performs a corrective measure on at least a portion of the data for the external request using the kernel. In some implementations, the corrective measure can include using one of the operations noted above for error detection, such as a CRC, a checksum, or an ECC to correct up to a certain number of errors or flipped bits based on the correcting capability or robustness of the algorithm.

In other implementations, the corrective measure can include requesting another NVMe node to resend the data or to send a copy of the data. In the case of EC data, the corrective measure can include requesting a parity block to reconstruct a corrupted block using other data blocks and the requested parity block. The process then returns to block 206 to receive other external requests from other NVMe nodes to access the shared cache.

As will be appreciated by those of ordinary skill in the art with reference to the present disclosure, the order of blocks for the error detection process may differ in other implementations. For example, the execution of the kernel in block 202 and the use of the shared cache in block 204 may overlap while blocks 206 to 210 are performed iteratively in response to new external requests being received by the NVMe node.

Figure 3:
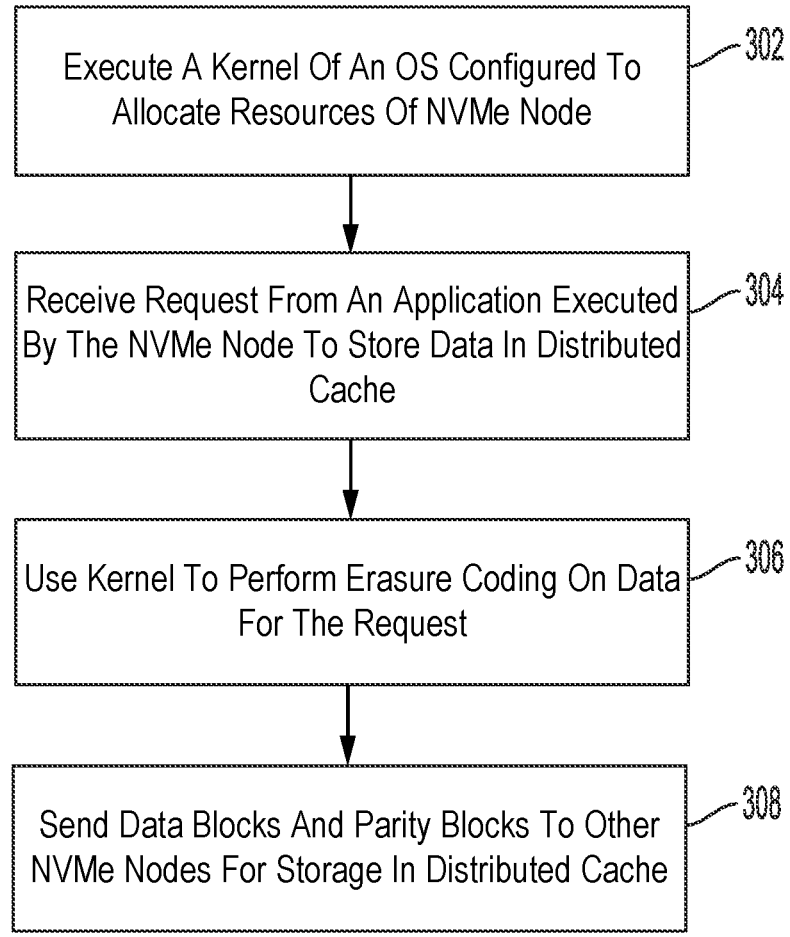
FIG. 3 is a flowchart for an Erasure Coding (EC) process for a distributed cache according to one or more embodiments.

FIG. 3 is a flowchart for an EC process for a distributed cache according to one or more embodiments. The process of FIG. 3 may be performed by, for example, a processor 106 of an NVMe node 104 or processor 107C of smart NIC 108C in FIG. 1 executing an EC module 18.

In block 302, a kernel of an OS is executed by a processor to allocate resources of an NVMe node. In implementations where the processor executes an OS for a smart NIC (e.g., smart NIC 108C in FIG. 1), the processor may use the OS to allocate resources of the smart NIC and the memory or storage that it controls.

In block 304, the kernel executed by the processor receives a request from an application executed by the NVMe node to store data in the distributed cache. The request may come from an application executed in the user space, such as with a system call. The application may be executed by the same processor that executes the kernel or by a different processor of the NVMe node.

In block 306, the processor uses the kernel to perform EC on the data for the request. In more detail, the kernel may fragment or divide the data into equally sized data blocks and calculate parity blocks based on the data blocks, such as by performing XOR operations to generate a predetermined number of parity blocks. The data blocks and data used in calculating the parity blocks can be stored in the kernel space of the at least one memory. In some implementations, the processor may select a particular EC ratio of data blocks to parity blocks (i.e., M data blocks and N parity blocks) based on at least one of a frequency of access of the data (e.g., read frequency and/or write frequency for logical addresses associated with the data to be written) and the application originating the request. In this regard, the processor may identify the application using an application ID, which may be based at least in part on a port number for the application and an address for the NVMe node (e.g., a Media Access Control (MAC) address).

In block 308, the NVMe node sends data blocks and parity blocks resulting from the EC in block 306 to other NVMe nodes on the network for storage of the blocks in the distributed cache. In some implementations, each block may be stored in a different shared cache of the distributed cache at different NVMe nodes as a safeguard against a failure at one of the NVMe nodes. The processor may use a cache directory including, for example, NVMe namespaces associated with addresses or device identifiers for respective NVMe nodes to prepare NVMe messages and/or packets to send to the different NVMe nodes for storing the blocks.

As discussed above, by performing EC in a kernel space of the NVMe node, the EC operations can be performed faster and with less processing and memory resources than if the data for performing the EC had to traverse the full kernel to reach an application in the user space that generates the blocks that would then be sent back through the kernel to the other NVMe nodes. This performance benefit can be further improved by using the processor of a network interface of the NVMe node, such as processor 107C of smart NIC 108C in FIG. 1 to perform EC closer to the network.

Figure 4:
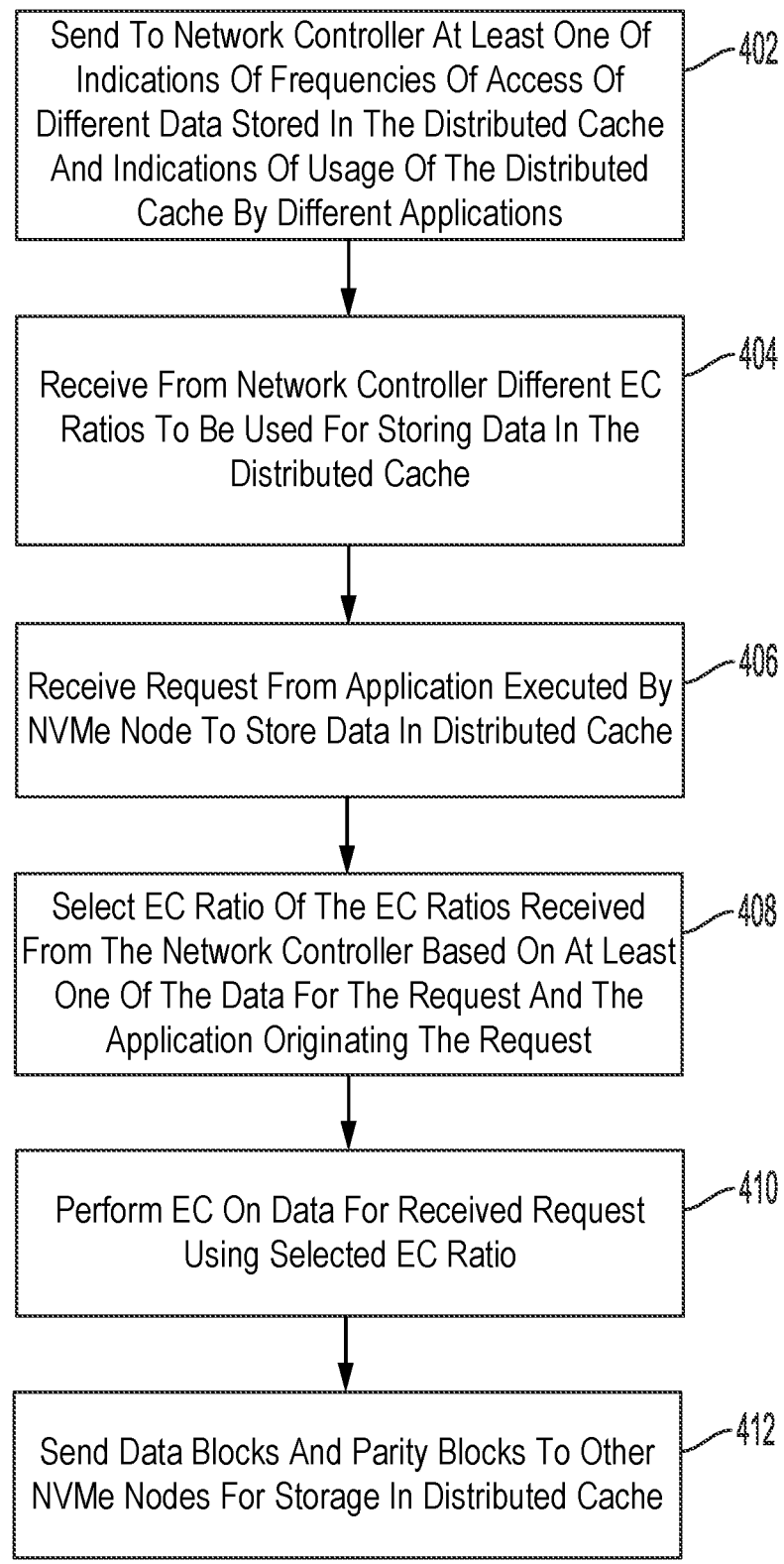
FIG. 4 is a flowchart for an EC process including the selection of an EC ratio according to one or more embodiments.

FIG. 4 is a flowchart for an EC process that includes the selection of an EC ratio according to one or more embodiments. The process of FIG. 4 can be performed by, for example, a processor 106 of an NVMe node 104 or processor 107C of smart NIC 108C in FIG. 1 executing an EC module 18.

In block 402, the processor sends to a network controller (e.g., network controller 112) at least one of indications of frequencies of access of different data stored in the distributed cache and indications of usage of the distributed cache by different applications. In this regard, caching module 12 may keep information on the frequency of access of different data in the distributed cache and/or the applications that read data from and write data to the distributed cache. In some implementations, the indication of the frequency of access may be for only data stored in the shared cache of the NVMe node or the indication of usage by different applications may be only for applications executed by the NVMe node.

In other implementations, a caching module of the NVMe node may track access of the distributed cache, such as by tracking write requests and read requests to different logical addresses or ranges of logical addresses by applications executed by the NVMe node to any shared cache in addition to external accesses to its shared cache from other NVMe nodes. Alternatively, the NVMe node may track accesses to its shared cache by all applications that access the shared cache, including applications executed by other NVMe nodes. In such implementations, the caching module may use an application ID based on a socket number for the application and a MAC address for the network interface of the NVMe node executing the application.

In block 404, the processor receives from the network controller different EC ratios to be used for storing data in the distributed cache. In some implementations, the processor may store the different EC ratios in a kernel space of a memory of the NVMe node and may associate the ratios with different application IDs and/or levels of frequency of access. For example, an EC ratio of four data blocks and two parity blocks may be associated with a level of access (e.g., write requests and read requests) of data in the distributed cache that is greater than a threshold level, while an EC ratio of eight data blocks and two parity blocks may be associated with a level of access of data in the distributed cache that is less than the threshold level. As discussed above, this can allow for less data traffic and processing for data that is frequently accessed to better balance network traffic and processing resources.

In other cases, different EC ratios may be associated with different applications or data flows such that the network controller can use a lower number of data blocks for applications or data flows requiring less latency (i.e., a higher QoS). As noted above, a lower number of data blocks can reduce the processing time needed to calculate the parity blocks and reconstruct data blocks.

In block 406, the processor receives a request from an application executed by the NVMe node to store data in the distributed cache. For example, the caching module 12 may receive a request from an application executed in a user space to store data in the distributed cache.

In block 408, the processor selects an EC ratio from the EC ratios received from the network controller in block 404 based on at least one of the data to be stored (i.e., the logical address for the data) and the application originating the request. In implementations where the processor considers both a frequency of access for the data and the application originating the request, the processor may select the EC ratio with the lowest number of data blocks for the corresponding frequency of access and the corresponding application ID.

In block 410, the processor performs EC on the data for the request using the EC ratio selected in block 408. In more detail, the kernel may fragment or divide the data into equally sized data blocks and calculate parity blocks based on the data blocks, such as by performing XOR operations to generate a predetermined number of parity blocks in keeping with the EC ratio selected in block 408.

In block 412, the NVMe node sends the data blocks and parity blocks resulting from the EC in block 410 to other NVMe nodes on the network for storage of the blocks in the distributed cache. In some implementations, each block may be stored in a different shared cache of the distributed cache at different NVMe nodes as a safeguard against a failure at any one of the NVMe nodes. In some cases, one of the blocks may be stored in the shared cache of the NVMe node performing the EC. The processor of the NVMe node may use a local cache directory including, for example, NVMe namespaces associated with addresses or device identifiers for respective NVMe nodes to prepare NVMe messages and/or packets to send to the different NVMe nodes for storing the blocks.

Those of ordinary skill in the art will appreciate with reference to the present disclosure that the order of the blocks in FIG. 4 may differ in other implementations. For example, the receipt of different EC ratios from the network controller in block 404 may occur before the NVMe node sends the indications to the network controller in block 402. In this regard, and as discussed in more detail below with reference to the EC ratio determination process of FIG. 5, the NVMe nodes in the network may periodically send indications to the network controller, such as several times per day, so that the network controller can adjust the EC ratios based on updated usage of the distributed cache and network traffic.

Figure 5:
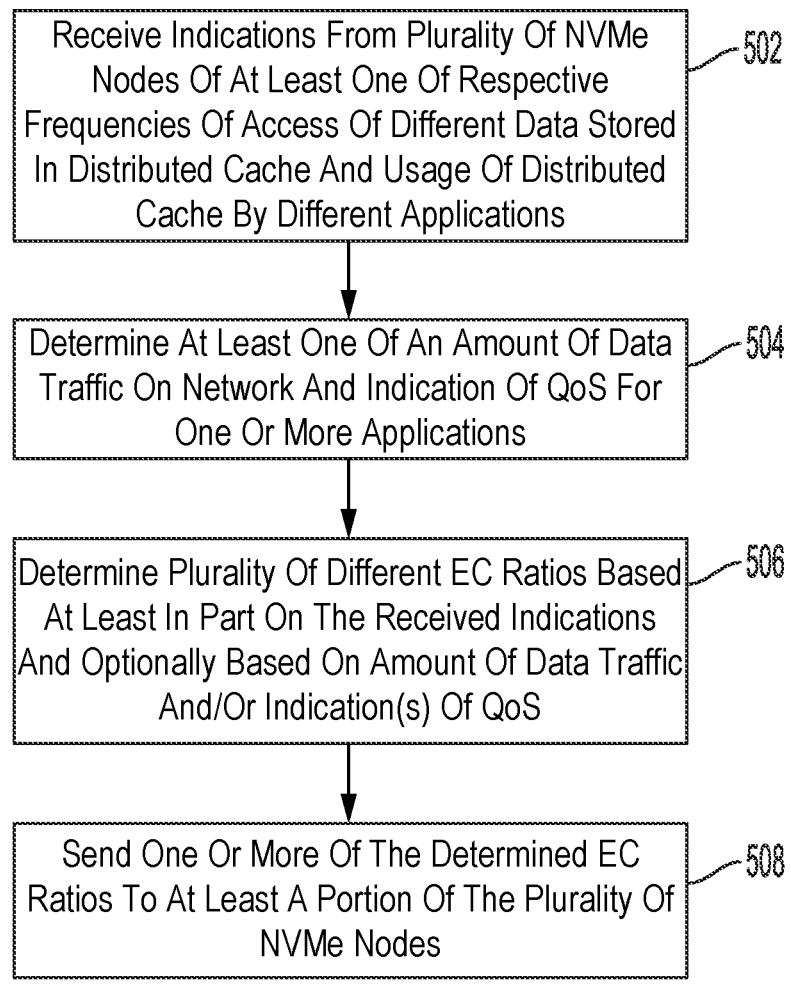
FIG. 5 is a flowchart for an EC ratio determination process according to one or more embodiments.

FIG. 5 is a flowchart for an EC ratio determination process according to one or more embodiments. The process of FIG. 5 can be performed by, for example, a processor 116 of network controller 112 in FIG. 1 executing EC ratio module 30. The EC ratio determination process of FIG. 5 may be performed periodically, such as several times per day, to adjust the EC ratios for different data and/or different applications using the distributed cache.

In block 502, the network controller receives indications from a plurality of NVMe nodes including at least one of indications of respective frequencies of access of different data stored in the distributed cache and indications of usage of the distributed cache by different applications. As discussed above with reference to the process of FIG. 4, each NVMe node in the network may keep track of cache usage by different applications either accessing its shared cache or applications being executed by the NVMe node. In addition, each NVMe node may keep track of the access of different data stored in its shared cache or data being accessed by the applications executed by the NVMe node. The NVMe nodes may then periodically send indications to the network controller of the distributed cache usage by the different applications and/or indications of the frequencies of access of different data stored in the distributed cache, such as by indicating a logical address range for the data and a level of access (e.g., low, medium, or high) or the number of writes and/or reads to the data within a predetermined period of time.

The network controller may store these indications, such as memory access frequencies 26 and application memory usage 28 shown in FIG. 1. In addition, the network controller can add the indications received from the different NVMe nodes together for the same logical addresses and/or the same applications, which may be identified by an application ID.

In block 504, the network controller determines at least one of an amount of data traffic on the network and a QoS indication for one or more applications using the distributed cache. In some implementations, the network controller may receive indications from switches or routers in the network indicating an overall traffic level or the data traffic associated with particular applications using the distributed cache. In this regard, the network controller can be an SDN controller in some implementations that may communicate with the switches or routers using a network protocol, such as OpenFlow or Open Virtual Switch (OVS). A QoS requirement for an application may be determined, for example, from a user input, such as a maximum latency in retrieving or storing data or may be determined from a priority field set by the application in its messages, such as an 802.1 Qbb priority field used for priority-based flow control. In some implementations, the QoS or priority indication can be stored with the resource usage information for the application.

In block 506, the network controller determines a plurality of different EC ratios based at least in part on the received indications and optionally based on the amount of data traffic and/or indications of QoS determined in block 504. As discussed above, the network controller may set a lower number of data blocks in an EC ratio for data that is more frequently accessed or for applications that use the distributed cache more often, or that require a higher QoS. The network controller may also consider the amount of data traffic to lower the number of data blocks and/or parity blocks used for one or more of the EC ratios to reduce data traffic on the network.

In block 508, the network controller sends one or more of the determined EC ratios to at least a portion of the plurality of NVMe nodes in the network. The network controller may also keep track of which NVMe nodes sent indications in block 502 so that the EC ratios for particular applications or data can be sent back to the NVMe nodes that sent the indications. In this regard, if an EC ratio is kept the same for a particular application or for data stored in the distributed cache, it may not be necessary to send a new EC ratio to certain NVMe nodes in the network. The NVMe nodes may then use the determined EC ratios when erasure coding data for particular applications and/or data to be stored in the distributed cache, such as in the EC process of FIG. 4 discussed above.

Those of ordinary skill in the art will appreciate with reference to the present disclosure that the blocks for the EC ratio determination process of FIG. 5 may differ in other implementations. For example, block 504 may be omitted in implementations where the EC ratios are only determined based on the indications of data access frequency and/or usage of the distributed cache received from the NVMe nodes.

As discussed above, the foregoing use of in-kernel error detection, error correction, and EC for a distributed cache can reduce the latency in retrieving and storing data since the data does not need to be processed through the full network and I/O stacks of the kernel and then processed by an application in the user space. In addition to reducing the latency for these operations, the foregoing adjustment of EC ratios based on the frequency of access of the data, usage of the distributed cache by different applications, QoS for different applications, and/or data traffic in the network can better balance consumption of the resources of the distributed cache in terms of processing, memory, and network bandwidth.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Non-Volatile Memory express (NVMe) node, comprising:
    a memory configured to be used at least in part as a shared cache in a distributed cache;
    a network interface configured to communicate with one or more other NVMe nodes in a network, the one or more other NVMe nodes each configured to provide a respective shared cache for the distributed cache; and
    at least one processor configured to:
        execute a kernel of an Operating System (OS) configured to allocate resources of the NVMe node;
        receive, via the network interface, an external request from another NVMe node in the network to read data stored in the shared cache or to write data in the shared cache; and
        perform, using the kernel, an error detection operation on the data for the external request.

2. The NVMe node of claim 1, wherein the kernel performs the error detection operation by executing an extended Berkeley Packet Filter (eBPF) program.

3. The NVMe node of claim 1, wherein the at least one processor is further configured to:
    determine that there is at least one error in the data for the external request; and
    in response to determining that there is at least one error, perform a data recovery operation using the kernel on at least a portion of the data for the external request.

4. The NVMe node of claim 1, wherein the at least one processor is further configured to perform the error detection operation in a kernel space of the OS.

5. The NVMe node of claim 1, wherein the error detection operation includes performing a Cyclic Redundancy Check (CRC) on the data, performing a parity check on the data, performing a checksum on the data, or performing an Error Correcting Code (ECC) on the data.

6. The NVMe node of claim 1, wherein the at least one processor is further configured to perform, using the kernel, Erasure Coding (EC) on additional data to be stored in the distributed cache.

7. The NVMe node of claim 1, wherein the at least one processor is further configured to send to a network controller, via the network interface, at least one of indications of respective frequencies of access of different data stored in the distributed cache and indications of usage of the distributed cache by different applications.

8. The NVMe node of claim 1, wherein the at least one processor is further configured to:
    receive, from a network controller, different Erasure Coding (EC) ratios to be used by the NVMe node for data access in the distributed cache, wherein the received EC ratios are based on at least one of a frequency of access of different data stored in the distributed cache and a usage of the distributed cache by different applications;
    receive, from an application executed by the NVMe node, an internal request to store additional data in the distributed cache or to retrieve additional data from the distributed cache;
    select an EC ratio of the different EC ratios received from the network controller based on at least one of the application originating the request and the additional data for the internal request; and
    perform, using the kernel, EC on the additional data for the internal request using the selected EC ratio.

9. The NVMe node of claim 1, wherein the at least one processor is a processor of the network interface.

10. A method, comprising:
    executing a kernel of an Operating System (OS) configured to allocate resources of a Non-Volatile Memory express (NVMe) node;
    receiving, by the kernel, a request from an application executed by the NVMe node to store data in a distributed cache, wherein the distributed cache includes a plurality of shared caches at respective NVMe nodes on a network; and
    using the kernel to perform Erasure Coding (EC) on the data for the request.

11. The method of claim 10, wherein the kernel performs the EC by executing an extended Berkeley Packet Filter (eBPF) program.

12. The method of claim 10, further comprising performing the EC in a kernel space of the OS.

13. The method of claim 10, further comprising sending to a network controller at least one of indications of respective frequencies of access of different data stored in the distributed cache and indications of usage of the distributed cache by different applications.

14. The method of claim 10, further comprising:
    receiving, from a network controller, different EC ratios to be used by the NVMe node for accessing data in the distributed cache, wherein the received EC ratios are based on at least one of a frequency of access of different data stored in the distributed cache and a usage of the distributed cache by different applications;
    receiving, from the application executed by the NVMe node, an internal request to store additional data in the distributed cache or to retrieve additional data from the distributed cache;
    selecting an EC ratio of the different EC ratios received from the network controller based on at least one of the application originating the internal request and the additional data for the internal request; and performing, using the kernel, EC on the additional data for the internal request using the selected EC ratio.

15. The method of claim 10, further comprising:
receiving an external request from another NVMe node in the network to read different data stored in a shared cache of the NVMe node or to write different data in the shared cache of the NVMe node; and
using the kernel to perform an error detection operation on the different data for the external request.

16. The method of claim 15, further comprising:
determining that there is at least one error in the different data for the external request; and
in response to determining that there is at least one error, performing a data recovery operation using the kernel on at least a portion of the different data for the external request.

17. The method of claim 15, wherein the error detection operation includes performing a Cyclic Redundancy Check (CRC) on the different data, performing a checksum on the different data, performing a parity check on the different data, or performing an Error Correcting Code (ECC) on the different data.

18. The method of claim 10, wherein the EC is performed using a kernel of a network interface of the NVMe node.

19. A network controller, comprising:
a network interface configured to communicate with a plurality of Non-Volatile Memory express (NVMe) nodes in a network, wherein each of the NVMe nodes of the plurality of NVMe nodes is configured to provide a respective shared cache for a distributed cache; and
means for:
receiving, via the network interface, indications from the plurality of NVMe nodes of at least one of respective frequencies of access of different data stored in the distributed cache and usage of the distributed cache by different applications;
determining a plurality of different Erasure Coding (EC) ratios based at least in part on the received indications; and
sending, via the network interface, one or more of the determined EC ratios to at least a portion of the plurality of NVMe nodes.

20. The network controller of claim 19, further comprising means for determining the plurality of different EC ratios based at least in part on at least one of an amount of data traffic on the network and an indication of a Quality of Service (QoS) for an application.

\* \* \* \* \*